INVENTORS
E. MATHZEIT-
A. ZIEGLER-
W. SCHRODER
BY
[illegible]
ATTORNEY

INVENTORS
E. MATHZEIT
A. ZEIGLER
W. SCHRODER
BY Robert Harding Jr.
ATTORNEY

June 1, 1954 E. MATHZEIT ET AL 2,679,990

CARRIER SEPARATING DEVICE SCANNING THE DESTINATION MARKINGS OF PNEUMATIC CARRIERS

Filed May 17, 1952 4 Sheets-Sheet 3

INVENTORS
E. MATHZEIT
A. ZIEGLER
W. SCHRODER
Robert Harding Jr.
ATTORNEY

June 1, 1954 E. MATHZEIT ET AL 2,679,990

CARRIER SEPARATING DEVICE SCANNING THE DESTINATION MARKINGS OF PNEUMATIC CARRIERS

Filed May 17, 1952 4 Sheets-Sheet 4

INVENTORS
E. MATHZEIT
A. ZIEGLER
W. SCHRODER
BY Robert Harding Jr.
ATTORNEY

Patented June 1, 1954

2,679,990

UNITED STATES PATENT OFFICE 2,679,990

CARRIER SEPARATING DEVICE SCANNING THE DESTINATION MARKINGS OF PNEUMATIC CARRIERS

Erich Mathzeit, Berlin-Friedenau, Alfred Ziegler, Stuttgart, Wurttemberg-Baden, and Willi Schröder, Berlin, Germany, assignors to International Standard Electric Corporation, New York, N. Y., a corporation of Delaware Application May 17, 1952, Serial No. 288,568

Claims priority, application Germany May 18, 1951

4 Claims. (Cl. 243—36)

Figure 1:
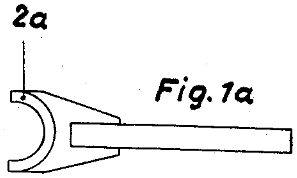
Figure 1:
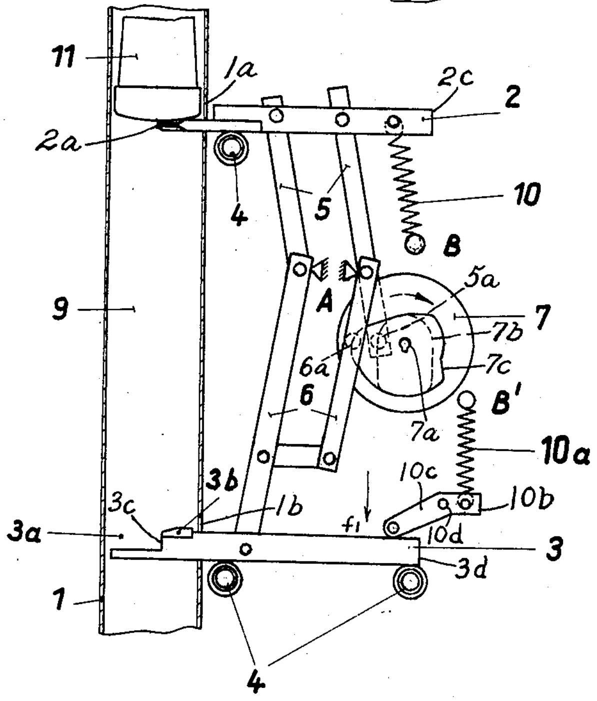

This invention relates to pneumatic dispatch tube carrier systems wherein carriers are sensed for distinctive marks indicative of their destination and particularly to separating devices for separating a succession of carriers for sensing said carriers singly.

It is known to provide a carrier separating device consisting of two separating shutters suitably spaced and controlled by a linkage mechanism between which shutters the pneumatic carriers are scanned electrically while in a stationary position between the shutters. These known separating devices suffer from the disadvantage that a carrier present in the tube chamber between the shutters is likely to receive physical shocks caused by succeeding carriers striking the uppermost shutter. Such physical shocks may cause erroneous sensing. The prior art separating device further suffered from the disadvantage that the uppermost shutter was required to penetrate the space between abutting carriers and lift all but the first carrier which is the one to be sensed, thus imposing a considerable strain on the upper shutter and its actuating mechanism. As the number of succeeding carriers piled up this load became greater and therefore the prior art required a mechanism having a considerable extra margin of power to perform this lifting function.

This invention eliminates both the foregoing disadvantages by providing a pair of shutters which are arranged to drop the first carrier to be sensed a predetermined distance into the sensing chamber thereby physically divorcing the first carrier from contact with the succeeding carriers and rendering it unnecessary for the uppermost shutter to raise the carriers waiting to be sensed. Accordingly, it is an object of this invention to provide a carrier separating device wherein the carrier to be sensed is not exposed to shocks from succeeding carriers by automatically providing a separation of the carrier to be sensed from the succeeding carriers.

It is a further object of this invention to provide a carrier separating device wherein the uppermost shutter is not required to raise the succeeding carriers.

It is a further object of the invention to provide a stepped lower separating shutter operated so as to be partially retracted from the tube under control of a cam.

It is a further object of this invention to provide damping means to absorb the shock incidental to the striking of the uppermost shutter by tube carriers.

To achieve the objects above mentioned we provide a linkage system which in accordance with our inventive idea is controlled by a cam mechanism. It is convenient herewith to control the two separating shutters by two separate parallelogram levers supported at fixed points, and to actuate said levers by means of a rotatable double cam.

In accordance with a further inventive idea, the cam mechanism is driven by a high-speed electric fractional H. P. motor with armature braking by means of a gear reduction train giving a speed reduction of at least 1:100.

Figure 2:
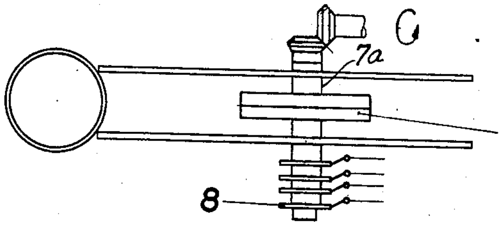
Figures 3, 4, 5:
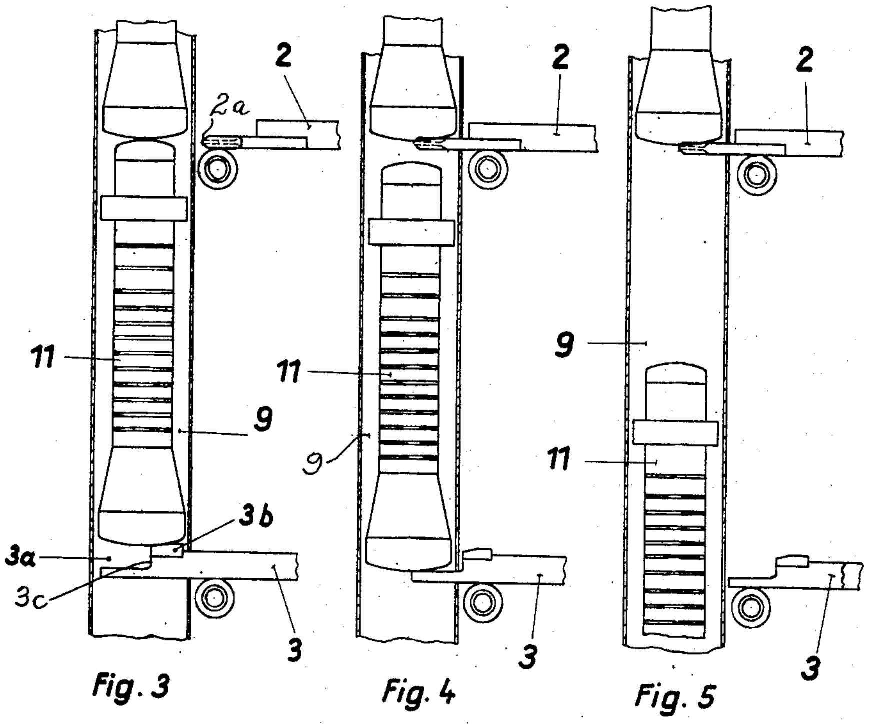
Figures 6, 7, 8, 9:
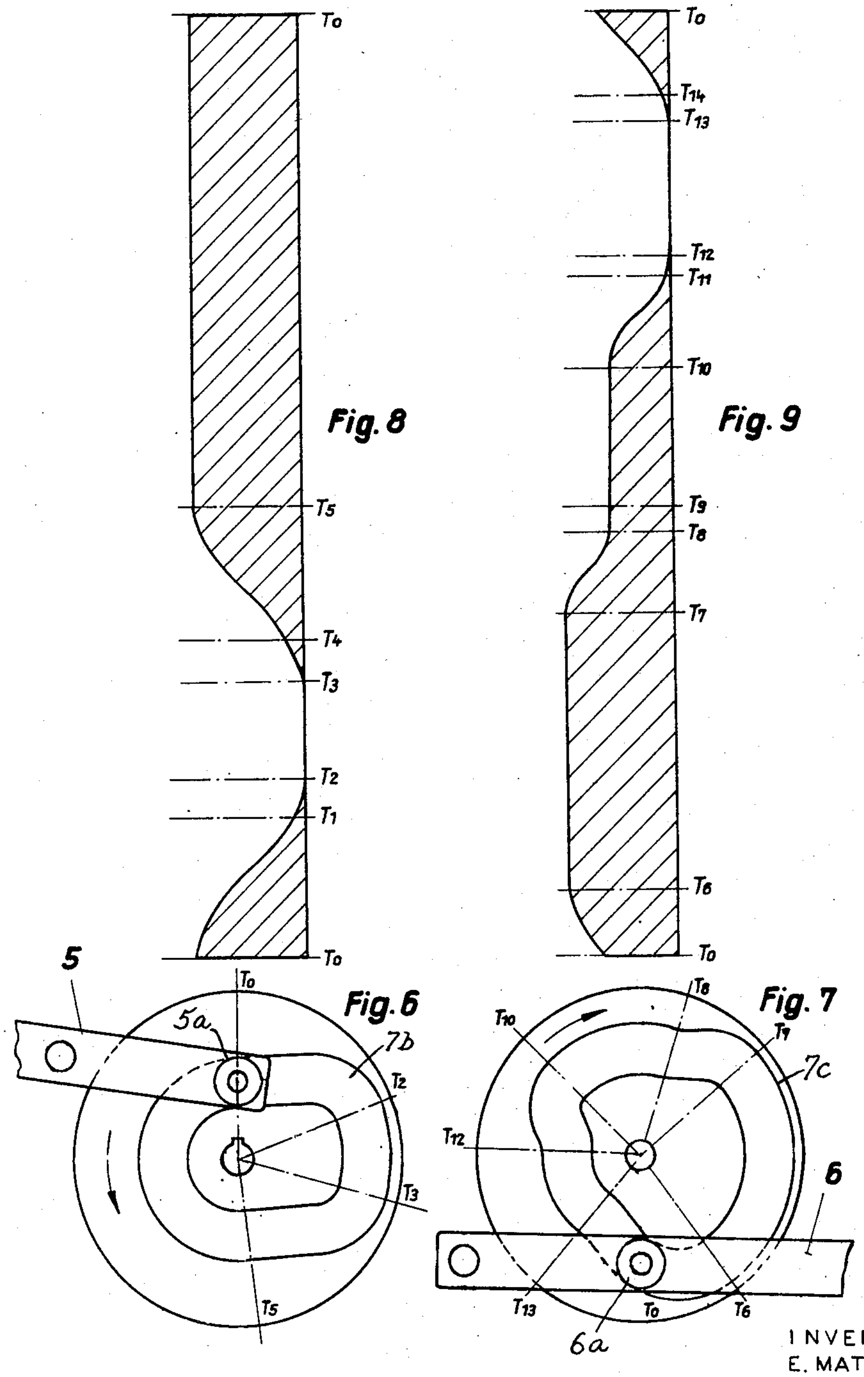
Figures 10, 11:
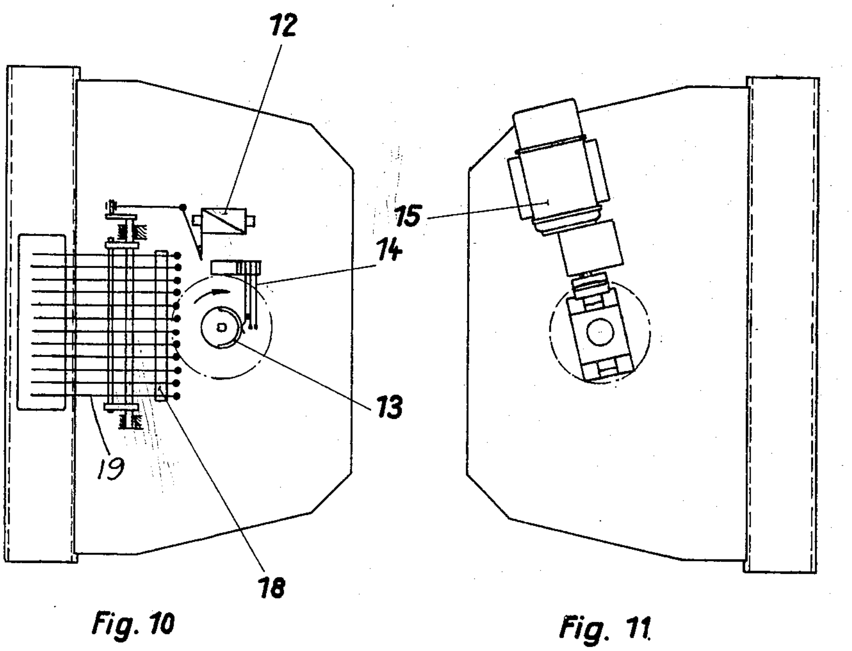
Figure 12:
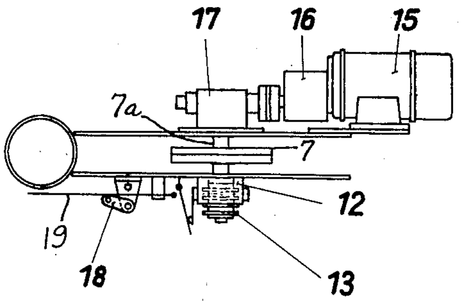

The invention is explained in the following description with the aid of the embodiment shown in the accompanying drawings wherein:

Fig. 1 shows the carrier separator in a side elevation,

Fig. 1–A shows the upper separating shutter in a top view,

Fig. 2 shows a top view of the carrier separator with the shaft of the cam mechanism, Figs. 3 to 5 show the passage of a pneumatic carrier through the tube chamber in three phases, Fig. 6 shows the cam controlling the upper separating shutter, Fig. 7 shows the cam controlling the lower separating shutter, Fig. 8 shows the displacement vs. angle diagram of the upper separating shutter, Fig. 9 shows the displacement vs. angle diagram of the lower separating shutter, Fig. 10 shows the device scanning the destination marking, Fig. 11 shows the arrangement of the driving motor with its gearing system, Fig. 12 shows a top view of the Fig. 11.

Referring now to Fig. 1, there is shown a portion of a pneumatic tube 1 having a pair of spaced parallel slots 1–A, 1–B, extending within the wall of said tube part of the way around the circumference thereof. There is further provided a pair of spaced, parallel shutters 2, 3, adapted to selectively enter slots 1–A, 1–B, respectively, and, when inserted through said slots, are adapted to define a chamber 9 within said tube. The chamber 9 is adapted to accommodate the pneumatic tube carrier 11 so that it may be electrically scanned by scanning fingers 19, as will be more readily appreciated from an examination of Fig. 10. As shown in Fig. 1–A, the upper shutter 2 has a bifurcated end 2–A and, as shown in Fig. 1 is adapted to restrain the passage of carrier 11 into chamber 9 while the shutter 2 extends into tube 1 through slot 1–A.

In accordance with the invention, the end of the lower separating shutter 3 is provided with a step portion 3–A, and shaped as a spherical cap at the holding face 3–B. Both of the separating shutters are supported on rubber-metal bonded rollers 4. There is further provided a stiff helical spring 10 having one end attached to point B and having its other end attached to end 2–c of shutter 2. A similar spring 10–A is provided having one end attached to point B' and having its other end connected to an end 10–B of a lever 10–C. The points B and B' are fixed with respect to shutters 2 and 3, respectively. The lever 10–C is adapted to be urged in a counterclockwise direction about fixed pivot 10–D under the tension of spring 10–A and is adapted to exert a downward force against the end 3–D of lower shutter 3; the direction of the force being indicated by the arrow f1. Springs 10 and 10–A exert together with the rubber-metal bonded rollers damping action in a way that when the carrier hits the upper separating shutter 2 the latter rolls along the surface of the rubber-metal bonded member 4 which tensions the powerful springs 10 when the carrier strikes the lower shutter 3 after the upper shutter 2 has been retracted from the tube 1, the shutter 3 tends to pivot in a counterclockwise direction against the tension exerted by lever 10–C and its associated spring 10–A and thereby dissipates the impact force of the carrier. The advantage of this damping system is in the fact that the annoying noise which occurs in known systems when carriers hit a stop is almost entirely eliminated.

To control the separating shutters, two separate parallelogram levers 5 and 6 are provided which have their one end supported at the fixed points A, and which have their opposite ends pivotally connected to the separating shutters. These parallelogram levers are controlled by a double cam 7 which will be discussed in more detail below. The cam 7 is of the grooved type, having groove 7–B on one side thereof and another groove 7–C on its other side.

Fig. 2 shows in a top view the cam shaft 7–A which carries the double cam 7, the shaft being driven by a motor 15 (Fig. 12) by way of bevel gearing 17, and provided with further cams 8 for the electrical control of the drive and the scanning device. In the Figs. 3 to 5, the positions of the separating shutters are shown at three different phases in their operating cycle during the passage of a pneumatic carrier. Fig. 3 shows the situation when after the upper separating shutter 2 has moved out of the tube a carrier 11 has fallen on the spherically-shaped head 3–B of the lower separating shutter 3 corresponding to the upper tread of the stop portion, while some following second carrier rides on top of the first one. Fig. 4 shows the situation when due to a partial return movement of the lower separating shutter 3, a distance equal to the length of the upper tread 3–B and a forward movement of the upper separating shutter 2 into the tube, the carrier 11 drops an additional distance equal to the length of the riser 3–C of the step portion and comes to rest on the lower tread 3–A of the step portion of the lower shutter, the following carrier meanwhile being held separated from the lowermost carrier by the forked end (Fig. 1–A) of the upper shutter. The carrier in the tube chamber 9 does not touch the upper separating shutter because it has dropped the additional distance equal to the length of the riser of the step provided in accordance with the invention, so it can be scanned in this position without being exposed to shocks by following carriers. Fig. 5 finally shows the situation when the carrier 11 after completed scanning and complete retraction of the lower separating shutter 3 permits the carrier to leave the tube chamber 9.

Fig. 6 shows the contour of driving cam 7 which controls operation of the upper shutter 2, Fig. 7 shows the contour of driving cam 7 which controls operation of the lower separating shutter 3. The cam of Fig. 6 co-operates accordingly with the cam follower 5–A associated with the lever 5, the cam of Fig. 7 cooperates with the cam follower 6–A associated with the lever 6. The functions of these cam surfaces will become clear from the displacement vs. angle curves of the Figs. 8 and 9, of which Fig. 8 shows the displacement curve of the cam surfaces of Fig. 6, and Fig. 9 that of the cam surfaces of Fig. 7.

The points T0 of the cam surfaces of Fig. 6, and of the displacement diagram of Fig. 8 refer to the initial position. When the cam moves from points T0 to T2, the upper shutter 2 is retracted from the tube 1, to remain outside while the cam moves from points T2 to T3, and to re-enter the tube from points T3 to T5 so the entrance to tube portion 9 remains blocked up to the end of the duty cycle. In the time from points T1 to T4, the tube portion 9 is free so carrier 11 falls into the tube chamber portion 9. During the cam motion from points T4 to T5, the upper separating shutter 2 separates the admitted carrier from physical contact by any subsequent carrier.

In the Figs. 7 and 9, the points T0 refer again to the initial position. During the cam motion from points T0 to T6, the lowermost shutter 3 is pushed as far as possible into the tube portion 9 to retain this position until point T7 has been reached. From points T7 to T8, the lower separating shutter 3 partially retracts, so the carrier 1 is free to fall from the upper tread 3–B to the lower tread 3–C of the step 3–A. This partially retracted position of the shutter 3 at which the carrier is scanned is retained until T10 has been reached. While the cam moves from points T10 to T12, the lower separating shutter is completely retracted from the tube, so the scanned carrier can move on to its ultimate destination. When point T13 has been reached, the separating shutter 3 again starts to move into the tube. The lower separating shutter intercepts thus the next succeeding carrier to be scanned and which falls while the cam of Fig. 6 moves from points T1 to T4. In the time from points T8 to T9 it falls into the scanning step and at this position it is scanned electrically from points T9 to T10. In the time from points T11 to T14, the lower separating shutter 3 completely retracts from the tube portion 9 so the last scanned carrier can move onward.

The electrical scanning device is shown in Fig. 10. It comprises a solenoid 12 which is energized at the proper moment by way of the set 14 of contact springs controlled by a cam mechanism 13 on the cam driving shaft 7–A. When the solenoid picks up, the scanning fingers 19 are pressed against the contact rings of the pneumatic carrier. This scanning operation is well known and forms no part of our invention.

Fig. 11 shows the arrangement of the driving motor 15 with its reduction gearing which is also evident from the plan view of Fig. 12. As a convenient driving motor, a high-speed fractional H. P. motor is a good choice, with armature braking and a high gearing reduction of at least 1:100, since this allows the use of a considerably smaller mounting space. Fig. 12 shows the scanning device 18 as well as the cam shaft 7-A with the double cam 7 and the contact cams 13.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. In a pneumatic dispatch tube system wherein carriers are individually scanned for automatic direction to their destination, a carrier separating device for spacing carriers travelling through said system, said device comprising a portion of pneumatic tube having a pair of longitudinally spaced openings in the wall thereof, a pair of movable shutters, each adapted to be selectively moved into a different one of said openings, separate parallelogram mechanical linkage means, each supported at fixed points and each coupled to a different one of said shutters, double surface rotatable cam means, means for cyclically rotating said cam means, a pair of cam followers each affixed to an arm of differnt of said linkage means, each follower adapted to cooperate with a different surface of said cam means, a first one of said shutters having a step-portion adapted to be partially retracted and then wholly retracted from said tube portion under control of a first surface of said cam means during predetermined portions of an operating cycle of said cam means, the other of said shutters adapted to be wholly retracted from said tube under control of the other surface of said cam means during a different portion of the operating cycle of said cam means, the surfaces of said cam means having contours whereby a carrier travelling through said system toward said tube portion is caused to be restrained by said first shutter whereupon said other shutter is adapted to be moved into said tube to restrain passage of subsequent carriers into said tube portion, said first shutter adapted to thereafter partially retract from said tube a distance equal to the length of the top tread of said step-portion thereby to permit additional movement within said tube portion of a restrained carrier a distance equal to the length of the riser of said step-portion, said restrained carrier adapted to thereupon rest upon the bottom tread of said step-portion during scanning thereof, said first shutter adapted to completely retract after completion of scanning to permit said carrier to proceed toward its destination.

2. A carrier separating device as claimed in claim 1, further comprising resilient means cooperating with said shutters, and adapted to urge said first shutter in a direction substantially normal to the direcetion of movement thereof into said openings and in a direction opposite to the direction of travel of a carrier through said tube portion and adapted to urge said second shutter in the same direction as the direction of movement thereof into said tube portion.

3. A carrier separating device as claimed in claim 1, further comprising a plurality of rotatable, resilient support buffers, positioned outside said tube, said shutters adapted to roll on said buffers.

4. A carrier separating device as claimed in claim 1, wherein the upper tread of the step-portion of said first shutter comprises a spherical cap, and said second shutter comprises an element having a bifurcated end portion adapted to move through one of the openings in said tube.

References Cited in the file of this patent

UNITED STATES PATENTS

| Number | Name | Date |
|---|---|---|
| 2,052,597 | Beckmann | Sept. 1, 1936 |
| 2,442,025 | Smith | May 25, 1948 |
| 2,528,341 | Creely | Oct. 31, 1950 |

FOREIGN PATENTS

| Number | Country | Date |
|---|---|---|
| 488,149 | Great Britain | July 1, 1938 |
| 688,546 | France | Feb. 23, 1940 |